United States Patent
Couchman

(10) Patent No.: US 8,792,126 B2
(45) Date of Patent: Jul. 29, 2014

(54) SYSTEMS AND METHODS FOR ROUTING FACSIMILES BASED ON CONTENT

(71) Applicant: Kofax, Inc., Irvine, CA (US)

(72) Inventor: Roy Couchman, Anaheim, CA (US)

(73) Assignee: Kofax, Inc., Irvine, CA (US)

( * ) Notice: Subject to any disclaimer, the term of this patent is extended or adjusted under 35 U.S.C. 154(b) by 0 days.

(21) Appl. No.: 14/054,765

(22) Filed: Oct. 15, 2013

(65) Prior Publication Data

US 2014/0043649 A1  Feb. 13, 2014

Related U.S. Application Data

(63) Continuation of application No. 13/600,148, filed on Aug. 30, 2012, now Pat. No. 8,599,419, which is a continuation of application No. 11/743,110, filed on May 1, 2007, now Pat. No. 8,279,465.

(51) Int. Cl.
  *G06F 3/12*  (2006.01)
(52) U.S. Cl.
  USPC ........ 358/1.15; 358/1.13; 358/1.14; 358/462; 358/474; 382/140; 382/312; 382/317
(58) Field of Classification Search
  None
  See application file for complete search history.

(56) References Cited

U.S. PATENT DOCUMENTS

| | | | |
|---|---|---|---|
| 4,839,853 A | 6/1989 | Deerwester et al. | |
| 5,091,790 A | 2/1992 | Silverberg | |
| 5,159,667 A | 10/1992 | Borrey et al. | |
| 5,175,684 A | 12/1992 | Chong | |
| 5,227,893 A | 7/1993 | Ett | |
| 5,247,591 A | 9/1993 | Baran | |
| 5,287,199 A | 2/1994 | Zoccolillo | |
| 5,404,231 A | 4/1995 | Bloomfield | |
| 5,461,488 A | 10/1995 | Witek | |
| 5,497,319 A | 3/1996 | Chong et al. | |
| 5,535,120 A | 7/1996 | Chong et al. | |
| 5,577,028 A | 11/1996 | Chugo et al. | |
| 5,642,435 A * | 6/1997 | Loris | 382/229 |
| 5,721,826 A | 2/1998 | Gerson et al. | |
| 5,761,415 A | 6/1998 | Joseph et al. | |
| 5,838,461 A | 11/1998 | Hsieh | |
| 5,917,615 A | 6/1999 | Reifman et al. | |
| 6,104,500 A * | 8/2000 | Alam et al. | 358/1.15 |
| 6,310,942 B1 | 10/2001 | Bashoura et al. | |
| 6,477,243 B1 | 11/2002 | Choksi et al. | |

(Continued)

OTHER PUBLICATIONS

Non-Final Office Action from U.S. Appl. No. 11/743,110 dated Nov. 12, 2010.

(Continued)

*Primary Examiner* — Miya J Cato
(74) *Attorney, Agent, or Firm* — Zilka-Kotab, PC

(57) ABSTRACT

In one embodiment, a method for routing a facsimile in a computer readable format includes receiving text of a facsimile in a computer readable format; ascertaining one or more of a significance and a relevance of at least a portion of the text by locating one or more keywords in the text, wherein at least two of the keywords are not adjacent in the text; analyzing the text of the facsimile for at least one of a meaning and a context of the text; and routing the facsimile or text thereof to one or more destinations based on the analysis. Additional disclosed embodiments include systems and computer program products configured to similarly route a facsimile in a computer readable format.

33 Claims, 6 Drawing Sheets

(56) References Cited

U.S. PATENT DOCUMENTS

| | | | |
|---|---|---|---|
| 6,532,452 | B1 | 3/2003 | Pintsov et al. |
| 6,594,351 | B1 | 7/2003 | Bhogal et al. |
| 6,650,440 | B1 | 11/2003 | Wing |
| 6,700,674 | B1 | 3/2004 | Otsuka et al. |
| 6,744,761 | B1 | 6/2004 | Neumann et al. |
| 6,769,016 | B2 | 7/2004 | Rothwell et al. |
| 6,804,336 | B2 | 10/2004 | Chiu |
| 6,823,367 | B1 | 11/2004 | Wakasugi et al. |
| 6,856,432 | B2 | 2/2005 | Bobrow et al. |
| 6,906,817 | B1 | 6/2005 | Berard et al. |
| 6,963,929 | B1 | 11/2005 | Lee |
| 6,980,331 | B1 | 12/2005 | Mooney et al. |
| 7,003,497 | B2 | 2/2006 | Maes |
| 8,279,465 | B2 | 10/2012 | Couchman |
| 8,451,475 | B2 | 5/2013 | Couchman et al. |
| 8,593,673 | B2 | 11/2013 | Couchman et al. |
| 8,599,419 | B2 | 12/2013 | Couchman |
| 2002/0051221 | A1 | 5/2002 | Wakabayashi |
| 2002/0071136 | A1 | 6/2002 | Bobrow et al. |
| 2003/0002068 | A1 | 1/2003 | Constantin et al. |
| 2003/0086124 | A1 | 5/2003 | Parry |
| 2003/0117665 | A1 | 6/2003 | Eguchi et al. |
| 2003/0117666 | A1 | 6/2003 | Eguchi et al. |
| 2003/0133550 | A1 | 7/2003 | Mazor et al. |
| 2003/0164990 | A1 | 9/2003 | Watanabe |
| 2004/0125396 | A1 | 7/2004 | Burke |
| 2004/0174559 | A1 | 9/2004 | Mori |
| 2004/0252349 | A1 | 12/2004 | Green et al. |
| 2005/0125402 | A1 | 6/2005 | Viola et al. |
| 2005/0228996 | A1 | 10/2005 | Mayer |
| 2005/0278533 | A1 | 12/2005 | Mayer |
| 2006/0010217 | A1 | 1/2006 | Sood |
| 2006/0010218 | A1 | 1/2006 | Turcotte, II |
| 2006/0126101 | A1 | 6/2006 | Shutt et al. |
| 2006/0230004 | A1 | 10/2006 | Handley |
| 2007/0013960 | A9 | 1/2007 | Gordon et al. |
| 2007/0022060 | A1 | 1/2007 | Fitzsimmons |
| 2007/0086061 | A1 | 4/2007 | Robbins |
| 2007/0229889 | A1 | 10/2007 | Henry et al. |
| 2008/0273220 | A1 | 11/2008 | Couchman |
| 2008/0273221 | A1 | 11/2008 | Couchman |
| 2011/0032578 | A1 | 2/2011 | Couchman |
| 2012/0320422 | A1* | 12/2012 | Couchman ............ 358/1.15 |
| 2013/0169999 | A1 | 7/2013 | Couchman et al. |

OTHER PUBLICATIONS

Final Office Action from U.S. Appl. No. 11/743,110 dated Apr. 29, 2011.
Non-Final Office Action from U.S. Appl. No. 11/743,110 dated Dec. 12, 2011.
Notice of Allowance and Fee(s) Due from U.S. Appl. No. 11/743,110 dated Jun. 6, 2012.
Non-Final Office Action from U.S. Appl. No. 13/600,148 dated Jan. 4, 2013.
Restriction/Election Requirement from U.S. Appl. No. 11/743,112 dated Oct. 14, 2010.
Non-Final Office Action from U.S. Appl. No. 11/743,112 dated Dec. 27, 2010.
Final Office Action from U.S. Appl. No. 11/743,112 dated Jun. 7, 2011.
Non-Final Office Action from U.S. Appl. No. 11/743,112 dated Jan. 3, 2012.
Non-Final Office Action from U.S. Appl. No. 11/743,112 dated Jun. 14, 2012.
Notice of Allowance and Fee(s) Due from U.S. Appl. No. 11/743,112 dated Nov. 26, 2012.
Non-Final Office Action from U.S. Appl. No. 12/908,821 dated Jan. 6, 2011.
Final Office Action from U.S. Appl. No. 12/908,821 dated Jul. 11, 2011.
Non-Final Office Action from U.S. Appl. No. 12/908,821 dated Jun. 7, 2012.
Final Office Action from U.S. Appl. No. 12/908,821 dated Dec. 7, 2012.
"DeliveryWare Solutions: Esker and Esker DeliveryWare Overview," Esker Software 2003.
Notice of Allowance and Fee(s) Due from U.S. Appl. No. 12/908,821 dated Jul. 19, 2013.
Notice of Allowance and Fee(s) Due from U.S. Appl. No. 13/600,148 dated Jul. 29, 2013.
Non-Final Office Action from U.S. Appl. No. 13/776,541 dated Jun. 6, 2013.
Non-Final Office Action from U.S. Appl. No. 14/059,325 dated Feb. 24, 2014.
Final Office Action from U.S. Appl. No. 13/776,541 dated Dec. 31, 2013.
Notice of Allowance and Fee(s) Due from U.S. Appl. No. 13/776,541 dated Apr. 8, 2014.

\* cited by examiner

SYSTEMS AND METHODS FOR ROUTING FACSIMILES BASED ON CONTENT

RELATED APPLICATIONS

This application is a continuation of U.S. patent application Ser. No. 13/600,148, filed Aug. 30, 2012, which is a continuation of U.S. patent application Ser. No. 11/743,110, filed May 1, 2007, from which priority is claimed. Each of the aforementioned related applications is herein incorporated by reference.

FIELD OF THE INVENTION

The present invention relates to facsimile systems and methods, and more particularly, this invention relates to systems and methods for routing facsimiles.

BACKGROUND OF THE INVENTION

In the present day, computer systems that were once considered "stand alone" are evolving toward common interconnectivity. At one time, the various computers in an office were all operated individually. Today, the normal business utilizes a network, e.g., a local area network and/or a wide area network, to inter-connect the computers within the enterprise to facilitate work flow among the people who work in the enterprise. Once computerized systems in an office are networked together, it may then become necessary and appropriate to develop tools and methodologies for sharing common resources and for exchanging work files and data, even between modes of communication that were once considered quite distinct.

An example of the once distinct technology now being connected to the modern network and computerized work environment is the technology of facsimile document transmission. Originally, facsimile machines were individual devices which were capable of transmitting what is, in effect, a bit mapped version of a document through defined protocols over a telephone connection to a remote dedicated facsimile device which was capable of reproducing the bit map pattern on paper at the remote station. While stand-alone facsimile devices certainly still exist, it has become common to incorporate a facsimile transmission and reception function into computers and computer networks having other diverse and integrated functions.

It is typical for a facsimile transmission (fax) to be routed to a destination based on the telephone number dialed by the transmitting facsimile device. For instance, advanced systems route faxes based on the Direct Inward Dial (DID) number. Many times the desired recipient of the facsimile transmission cannot be determined solely from this telephone number, as is typically the case where multiple recipients share one fax line.

Additionally, though individual persons or groups in an enterprise may have unique fax numbers, a sender will typically only know the "main" fax number. Thus, a majority of faxes are transmitted to one central site, regardless of whether the intended recipient has a specific DID number assigned to him or her. From there, a human operator must typically sort through the printed faxes, and pass the paper copy on to the intended recipient via interoffice mail.

Additionally, many times a facsimile transmission is desired by more than one department or by a specific department in an organization due to the nature of the fax content. Such departments that desire the text or a copy of the facsimile transmission may not be specifically mentioned within the contents of the transmission.

Therefore, there is a current need for the ability to route faxes to a destination based on some aspect of the content of the fax itself.

SUMMARY OF THE INVENTION

A method for routing a facsimile, according to one embodiment, includes: receiving text of a facsimile in a computer readable format; ascertaining one or more of a significance and a relevance of at least a portion of the text by locating one or more keywords in the text, wherein at least two of the keywords are not adjacent in the text; analyzing the text of the facsimile for at least one of a meaning and a context of the text; and routing the facsimile or text thereof to one or more destinations based on the analysis.

In another embodiment, a system configured to route a facsimile, includes a processor and logic in and/or executable by the processor to cause the processor to: receive text of a facsimile in a computer readable format; ascertain one or more of a significance and a relevance of at least a portion of the text by locating one or more keywords in the text, wherein at least two of the keywords are not adjacent in the text; analyze the text of the facsimile for at least one of a meaning and a context of the text; and route the facsimile or text thereof to one or more destinations based on the analysis.

In yet another embodiment, a computer program product for routing a facsimile, includes a computer readable medium having program code embodied therewith. The program code is readable/executable by the processor to cause the processor to receive text of a facsimile in a computer readable format; ascertain one or more of a significance and a relevance of at least a portion of the text by locating one or more keywords in the text, wherein at least two of the keywords are not adjacent in the text; analyze the text of the facsimile for at least one of a meaning and a context of the text; and route the facsimile or text thereof to one or more destinations based on the analysis.

Other aspects and advantages of the present invention will become apparent from the following detailed description, which, when taken in conjunction with the drawings, illustrate by way of example the principles of the invention.

BRIEF DESCRIPTION OF THE DRAWINGS

For a fuller understanding of the nature and advantages of the present invention, as well as the preferred mode of use, reference should be made to the following detailed description read in conjunction with the accompanying drawings.

BEST MODE FOR CARRYING OUT THE INVENTION

The following description is the best mode presently contemplated for carrying out the present invention. This description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and as defined in dictionaries, treatises, etc.

Figure 1:
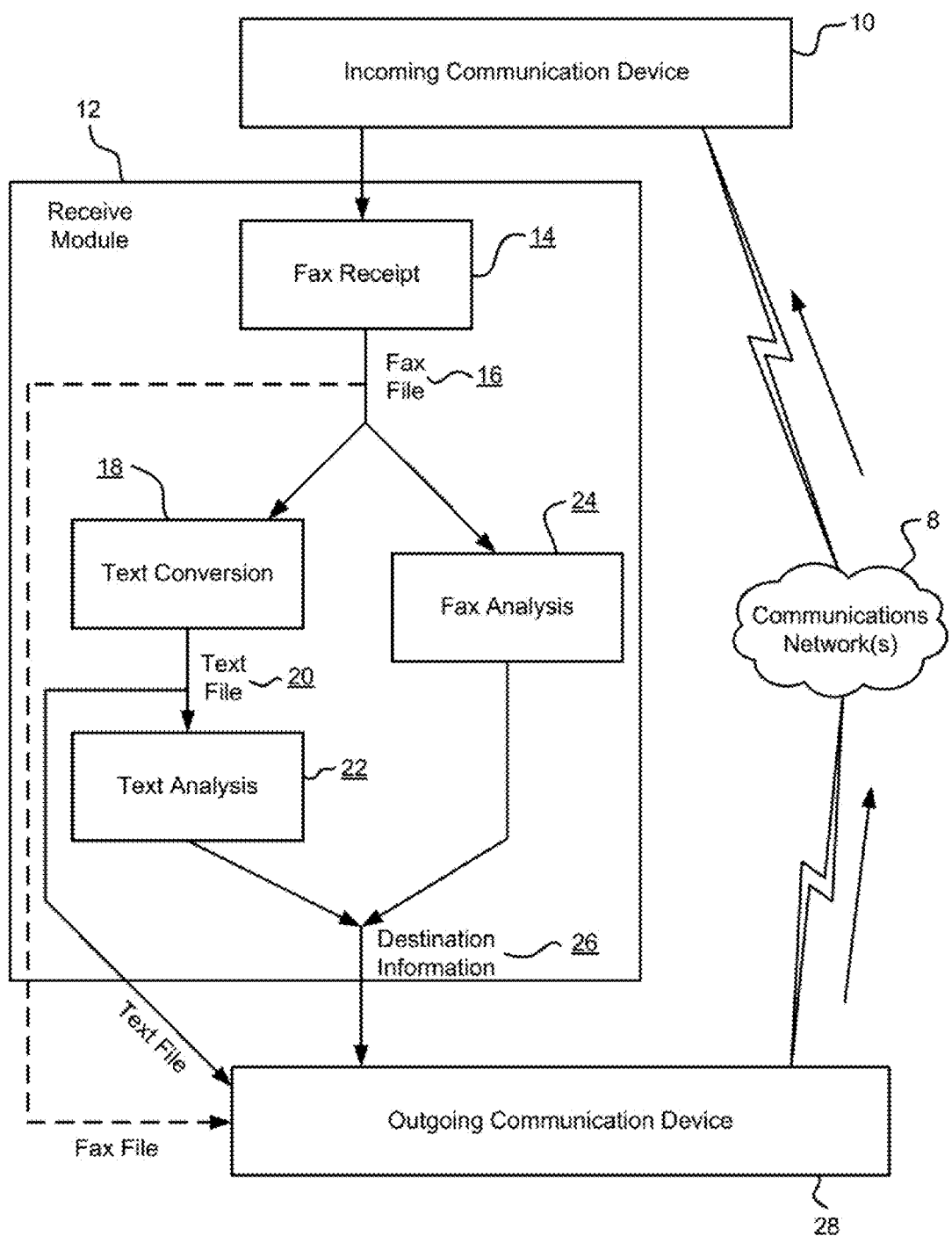
FIG. 1 is a system diagram of a fax routing system in accordance with one embodiment of the present invention.

FIG. 1 illustrates a system used to automate facsimile ("fax") destination routing via a computerized system, according to one embodiment. In general, the system determines where to route a fax based on one or more features of the fax and/or its content. The following modules and/or functions may operate or be performed in conjunction with, exclusive of, or as a supplement to, other routing mechanisms known in the art, such as routing based on a DID number. It should be kept in mind that in practice, an actual system implemented may have more, less or different components that those shown, the embodiment of FIG. 1 being presented by way of example of only one possible configuration.

As shown in FIG. 1, the system includes an incoming communication device 10. Incoming communication device 10 may be coupled to any type of communications network 8, such as a Wide Area Network (WAN, e.g. the Internet), Local Area Network (LAN), Public Switched Telephone Network (PSTN), etc., and combinations thereof. In general, any telecommunication or communication protocol may be used as input to the incoming communication device 10. The incoming communication device 10 may be any communication device which can interface with and receive data. Examples include, but are not limited to, modems, network interface cards (NICs), etc. The incoming communication device 10 can operate at any speed.

The incoming communication device 10 may be coupled to, or be integral with, a receive module 12. Receive module 12 may be any device which manipulates, stores, routes, and/or transmits data in any manner. In one form, receive module 12 can be any computer which comprises one or more of a display screen, a keyboard, a mouse, a processor (e.g., CPU), and a memory unit. In other forms, the receive module 12 may be a microcontroller, a Digital Signal Processor (DSP), a microcontrolling unit a plurality of microprocessors, a mainframe, a supercomputer, etc. In yet other forms, the receive module 12 is a software module running on a host.

The receive module may have access to memory, the memory being external to it, internal to it, or both. Memory may be comprised of one or more of disk storage, tape storage, magnetic media, non-volatile memory, EPROM memory, EEPROM memory, FLASH memory, DRAM memory, SRAM memory, ROM, CD memory, computer memory, and/or any like memory system or device.

A fax receipt module 14 operates within or in conjunction with receive module 12. Module 14 is generally used to receive data from the incoming communication device 10 and store it as a received fax file 16, e.g., in nonvolatile memory, volatile memory, or both. The received fax file 16 includes information which is received through the incoming communication device 10 and processed by module 14. The information in fax file 16 may be one or more fax transmissions or fax documents received through incoming communication device 10. In one embodiment, the fax receipt module 14 allows the receive module 12 to simulate or "look like" a fax machine to another fax machine coupled to the incoming communication device 10 via the communications network 8. In one embodiment, the fax module 14 is designed to receive fax transmissions. Other transmission forms and protocols may also be supported and recognized by fax receipt module 14 or other modules operating in conjunction therewith, including but not limited to email-based facsimile transmissions, Internet-based facsimile transmissions e.g., from online facsimile services, etc. Fax module 14 may also recognize various fax and coding schemes, such as Huffman encoding, and can be used to communicate at various telecommunication speeds. Also, the fax receipt module 14 may be coded to dynamically and automatically match the transmission speed of the data coming in through the incoming communication device 10. The fax receipt module 14 may have the purpose of receiving one or more fax transmissions through the incoming communication device 10 and processing that fax transmission into a data format stored in the received fax file 16, which can be subsequently processed.

In some cases, faxed transmissions will be received in a short period of time and multiple received fax files 16 will be created. Control code within the receive module 12 may be used to monitor the fax receipt module 14 to ensure data is not lost and that proper management of multiple files is carried out by the receive module 12. The received fax files 16 may optionally be prioritized by time, by a fax transmitting urgency, or other priority criterion.

Once one or more received fax files 16 have been formed via module 14, in one embodiment of the present invention, the fax file 16 may be converted by text conversion module 18 into a computer-readable text document. Optical character recognition (OCR) via a process known in the art is one of many techniques that may be used to process the received fax file 16. If more than one fax file 16 exists within the receive module 12 at one point in time, receive module 12 may determine via the priority scheme discussed above, which received fax file 16 is processed in which order by the text conversion module 18. The primary purpose of the text conversion module 18 is to analyze one or more received fax files 16 and translate those received fax files 16 from a non-text format to a text format. The text format, which is stored at least momentarily in text file 20, may be represented in one of many manners such as ASCII, binary, BCD, etc. In one form, the text conversion module 18 converts only a portion of the received fax file 16 to text, and in another form the text conversion module 18 will convert the entire received fax file 16 to text file 20. In either case, the text conversion module 18 converts the received fax file 16 to a text file 20 for at least one primary purpose. One primary purpose may be to determine from the faxed data any information which is needed to electronically log or track the fax transmission and determine where to properly route the fax transmission (i.e., fax destination).

Once the text conversion module 18 has generated the text file 20, the text of the file is analyzed by a text analysis module 22 for at least one of a meaning and a context of the text. The text of the text file 20 need not contain any destination information, such as physical addresses, email addresses, fax number, or names of desired recipients. The analysis performed by the text analysis module 22 can include one or more of the following determinations, in various aspects and permutations of the present invention.

In one approach, one or more keywords are identified in the fax text. These keywords can be comprised of one or more letters or symbols and can be found anywhere in the text of the fax file 16. More than one keyword can be identified in the fax text, and the identified keywords need not be adjacent or in any way related to each other in the fax text. Keywords can be determined based on a wide variety of criteria that best suits the needs of the user. The fax text may be compared to data stored in local or remote memory as part of the keyword identification. For example, a database containing predetermined words of importance may be compared to the fax text, and any matches between the fax text and the predetermined words or their literary derivations (e.g., plural form, tense, etc.) may be identified as keywords.

Once one or more keywords have been determined, an analysis can be performed to determine the meaning and/or context of the document or portion thereof. Any electronics-based method of textual or grammatical parsing or comprehension can be used, including those disclosed herein and others known in the art.

In one approach, the analysis can be based at least in part on the relation of other words in the fax text to the text of the keywords. For example, if one of the identified keywords is "resume," other words can be analyzed in the fax text in order to determine whether the text is in fact a summary of personal qualifications, in which case it would be desirable to forward the document to a hiring department, or is used in its verb form, in which case another department might be a more relevant destination.

Additionally, a determination can be made as to the relation of the one or more keywords to other symbols in the fax text. For example, if one of the identified keywords is "total," "account," "amount," or the like, numeric manipulation symbols in the text, such as the "+," "−," and "=" symbols, can be analyzed in relation to the keyword in order to determine whether the text is related to a relevant department, e.g. sales, and should be forwarded to such a department as a result.

Furthermore, the relation of one or more keywords to one or more other keywords can be determined. For example, if one of the identified keywords is "amount," and another identified keyword is "due," it is more likely than not that the fax text in question deals with a billing sheet and should be forwarded to the purchasing department. In another example, if one of the identified keywords is "sexual" and another keyword is "harassment," the relation of these two keywords can help determine whether the fax text is a complaint and should be forwarded to human resources or is a spam fax and should be sent to another department.

Also, the relation of one or more graphic elements to one or more other keywords can be determined. For example, if the fax text contains graphic elements in the form of photographs or diagrams, keywords such as "evidence" or "presentation" could be analyzed with respect to the graphic elements in order to determine whether to send the fax text to the litigation department or the sales department, for example.

The position of one or more of the identified keywords in the document can also be determined. This determination can be used to ascertain the relevance of the identified keyword(s) to the document as a whole. For example, if the word "resume" is found at the top center of a document, it is more likely to be a summary of personal qualifications than if the word is found within the text of a body paragraph in the middle of the fax text.

Additionally, the text of one or more keywords can be determined and analyzed. This text can be self-explanatory, such as an email address, or it can be significant in a way determined by the user. The text of one or more of the determined keywords can also be compared to data stored in memory as part of the analysis. For example, if a keyword contains a format such as "_____@_____._____," the keyword may be determined to be an email address and may then be analyzed as such. Additionally, keywords that suggest intended fax recipients, such as "marketing" or "sales," may be determined and used to assist in routing a fax to an intended location. Furthermore, a user may determine that all faxes containing the keyword "Product A" be routed to the Product A development team as well as the marketing department, and may add such a rule to the system.

During the analysis of the fax text, the fax text itself can be classified as a specific document type. An analysis of one or more elements of the fax text may lead to the fax text being classified as an invoice, resume, etc. For instance, fax text that contains keywords such as "experience" as well as dates, addresses, and contact information may be classified as a "resume" document type and be forwarded to the hiring department of a company as a result.

In one approach, during the analysis of the fax text, one or more keywords can be classified as a specific word type. Keywords that are indicative of certain types of documents can be classified according to the various possible types of documents. For example, a fax text that contains the word "invoice" may be relevant to the bookkeeping department of an organization, and so the fax would be classified as such. In a variation, several keywords can be classified, and the facsimile is then classified based on the classifications of the keywords.

Many techniques may be used to analyze and classify a fax and/or its text. Possible analysis and classification techniques include, but are not limited to, the use of a naïve Bayes classifier, tf-idf weighting, latent semantic analysis, support vector machines, an artificial neural network, a k-nearest neighbor algorithm, decision trees, and concept mining, etc.

A naive Bayes classifier (also known as Idiot's Bayes) is a simple probabilistic classifier based on applying Bayes' theorem with strong (naive) independence assumptions.

Tf-idf (term frequency-inverse document frequency) weighing is used to evaluate how important a word is to a document in a collection or corpus. The importance increases proportionally to the number of times a word appears in the document but is offset by the frequency of the word in the corpus.

Latent semantic analysis (LSA) uses a term-document occurrence matrix which describes the occurrences of terms in documents. The term-document matrix is a sparse matrix whose rows correspond to documents and whose columns correspond to terms, typically stemmed words that appear in the documents. An example of the weighting of elements of the matrix is tf-idf (term frequency-inverse document frequency): the element of the matrix is proportional to the number of times the terms appear in each document, where rare terms are upweighted to reflect their relative importance. The original occurrence matrix gives the relationship between terms and documents. Latent semantic analysis transforms this into a relationship between the terms and concepts, and a relation between the documents and the same concepts. The terms and documents are now indirectly related through the concepts. LSA is disclosed in greater detail in U.S. Pat. No. 4,839,853, which is herein incorporated by reference.

In particularly preferred approaches, known support vector machine processes are used. Support vector machines (SVMs) are a set of related supervised learning methods used for classification and regression. They belong to a family of generalized linear classifiers. They can also be considered a special case of Tikhonov regularization. A special property of SVMs is that they simultaneously minimize the empirical classification error and maximize the geometric margin. Hence they are also known as the maximum margin classifier.

An artificial neural network (ANN) or commonly just neural network (NN) is an interconnected group of artificial neurons that uses a mathematical model or computational model for information processing based on a connectionist approach to computation. In most cases an ANN is an adaptive system that changes its structure based on external or internal information that flows through the network. In more practical terms neural networks are non-linear statistical data modeling tools. They can be used to model complex relationships between inputs and outputs or to find patterns in data.

The k-nearest neighbor algorithm (k-NN) is a method for classifying objects based on closest training examples in the feature space. The training examples are mapped into multi-dimensional feature space. The space is partitioned into regions by class labels of the training samples. A point in the space is assigned to the class c if it is the most frequent class label among the k nearest training samples. Usually Euclidean distance is used. The training phase of the algorithm consists only of storing the feature vectors and class labels of the training samples. In the actual classification phase, the same features as before are computed for the test sample (whose class is not known). Distances from the new vector to all stored vectors are computed and k closest samples are selected. The new point is predicted to belong to the most numerous class within the set. The best choice of k depends upon the data; generally, larger values of k reduce the effect of noise on the classification, but make boundaries between classes less distinct. A good k can be selected by parameter optimization using, for example, cross-validation. The special case where the class is predicted to be the class of the closest training sample (i.e. when k=1) is called the nearest neighbor algorithm.

A decision tree is a decision support tool that generally refers to a graph or model of decisions and their possible consequences, including chance event outcomes, resource costs, and utility. A decision tree is a decision support tool, used to identify the strategy most likely to reach a goal. Another use of trees is as a descriptive means for calculating conditional probabilities.

Concept mining describes the discipline of extracting information from a document, such as an auto generated precis, or a subject classification, using the concepts in a document.

It is important to note that the facsimile need not necessarily be converted into a computer-readable text document in order for the facsimile to be routed correctly. In another embodiment of the present invention, a method of non-OCR document identification may be used by fax analysis module 24 to correlate a facsimile pattern to a form, with the routing of the fax being based on such a correlation.

For example, a method of analyzing a pattern of light and dark areas of a fax may be used in order to correlate the fax pattern to a form. After a pattern of light and dark areas of a fax are obtained, one or more document features are then determined from the pattern. One or more of these document features may then be analyzed in order to determine a routing destination using one or more of the following techniques.

In one approach, one or more of the document features may be compared to one or more features of a form. The form used in the comparison relates to one or more known document types. In another approach, the position of one or more of the document features within the fax pattern may be determined. In yet another approach, one or more of the document features may be compared to other features of the pattern. Combinations of these may also be used.

U.S. Pat. No. 5,159,667, incorporated herein by reference, describes systems and methods for document identification by characteristics matching, which may also be used in one or more of the various embodiments. The systems and methods described therein use the technique of recognition of global document features compared to a knowledge base of known document types. The system first segments the digitized image of a document into physical and logical areas of significance and attempts to label these areas by determining the type of information they contain, without using OCR techniques. The system then attempts to match the areas segmented to objects described in the knowledge base. The system labels the areas successfully matched then selects the most probable document type based on the areas found within the document. Using computer learning methods, the system is capable of improving its knowledge of the documents it is supposed to recognize, by dynamically modifying the characteristics of its knowledge base thus sharpening its decision making capability.

Once the destination is determined, the facsimile is routed to the destination. As in all embodiments, the facsimile may be routed to multiple destinations.

One example of the above method can be found in the use of characteristics matching of a fax document. The technique of characteristics matching involves the recognition of global document features compared to a knowledge base of known document types. The system first segments the digitized image of a document into physical and logical areas of significance and attempts to label these areas by determining the type of information they contain, without using OCR techniques.

The system then may attempt to match the areas segmented to objects described in a knowledge base, for example object data stored and classified in a database. The document knowledge base contains structured information relating to various classes of documents and the objects they each contain. This knowledge base provides the system with the expected structure and content of the documents which may be identified by the system.

For each segmented area on the document an object label may be assigned to the area by matching its structural characteristic, i.e., the physical location of the area on the document, and its relational characteristic, i.e., its location with respect all the other areas on the document, against the expected physical and relational characteristics provided by the knowledge base. As a result of this matching process, a table of evidence and disevidence is built for each area as containing a particular object. Based on the evidence and disevidence table, proposed object labels are assigned to the segment areas and a proposed classification designation is assigned to the document.

The module then begins a verification pass through the document. Using the proposed object labels and document classification, the structural and relational characteristics of the areas are again compared. If the results of the second-pass is the same as the first-pass, the object labels and document classification are considered verified. If the results are different, new labels are proposed and the verification step is repeated. After successful verification, the system then begins another pass to attempt to match further document characteristics in order to identify a possible sub-class of the document within the selected document class. Once the document class and possibly its sub-class as well as the objects it contains are adequately classified, this information is stored for later retrieval. The system labels the areas successfully matched then selects the most probable document type based on the areas found within the document. Using computer learning methods, the system is capable of improving its knowledge of the documents it is supposed to recognize, by dynamically modifying the characteristics of its knowledge base thus sharpening its decision making capability.

It should be noted that the above analysis examples may be used in conjunction with the use of systems utilizing at least one or more of name, e-mail, and contact information recognition, e.g. other fax routing, data extraction, or document classification systems. Use of the above examples can assist in substantiating the determination of a correct destination using these types of recognition and can increase the probability of correct delivery to art intended or appropriate recipient of the send facsimile.

It should also be noted that a single module may perform the functions of both the text analysis module 22 and the fax analysis module 24, and would therefore be able to receive and analyze both fax files 16 and text files 20. Additionally, both the text analysis module 22 and the fax analysis module 24 may perform analysis on the same fax file 16 through parallel processes. The results of both of these analyses can be compared and used to substantiate the destination information 26 obtained by both modules and increase the probability of correct delivery.

Based on the analysis of the received fax file 16, a text file 20, fax pattern, etc., destination information 26 is determined. Destination information 26 may consist of one or more destinations for the fax file 16, text file 20, or both.

Once the destination information 26 is determined by the above or any other methods, the received fax file 16 is routed to the proper destination. Additionally, if the text conversion module 18 has been used to generate a text file 20, the text file 20 may also be routed to the appropriate destination. This routing may be done via an outgoing communication device 28. Examples of an outgoing communication device include an electronic mail program, a fax machine, etc. The proper destination may be identified by the outgoing communication device 28 via an address, a user name, a numerical value, a network identifier, a file folder identifier, or any like identification means which can be found or identified via one or more of text analysis 22, fax analysis 24, and outgoing communication device 28.

Outgoing communication device 28 may be coupled to any communications network 8, e.g. the Internet, PSTN, etc., and can communicate across telecommunication lines, local area networks, token passing networks, computer interfaces, parallel computer interfaces, buses, or any like computer communication means to transmit the information received by incoming communication device 10 to the destinations identified by the text analysis 22, the fax analysis 24, or both. Additionally, in one embodiment the incoming communication device 10 and the outgoing communication device 28 may be the same device coupled to the receive module 12 and would therefore be able to both receive incoming fax information as well as transmit outgoing fax information.

In a preferred form, more than one destination is operatively coupled to the outgoing communication device 28, e.g., via network, PSTN, etc. It is important to note that any number N of destinations, computers, users, etc. can be coupled to the outgoing communication device 28 via the office network wherein N is a finite positive integer. In addition, the end user may not always be a computer, but may be a specific folder, directory, or disk area on a computer, a default computer, a disk drive/tape drive, a computer screen, a printer, a fax machine, etc.

In one example, the receive module 12 will interact with one or more of incoming communication device 10, text conversion module 18, text analysis module 22, fax analysis module 24, and outgoing communication device 28 to coordinate the execution of these modules and to record information regarding the processes performed by the system. For example, receive module 12 can prioritize, memory manage, and garage collect received fax files 16 as they are processed by module 18, module 22, and module 24. In addition, the receive module 12 can communicate with the text analysis 22, the fax analysis 24, and the outgoing communication device 28 to store fax receipt times, processing errors, information regarding destination, identification, and time of transmission along the office network.

Since the receive module 12 may function as a coordinator for the entire system illustrated in FIG. 1, the receive module may contain valuable information as to the receipt and transmission of faxed documents. This information can be stored in a log file for subsequent reference and future use. The log file is generated by the receive module 12 and may have optional or required (depending upon a system set-up) entries for each fax received by the incoming communication device 10 and processed by the computer 12. It is important to note that some fax receipts may be intended for logging, while other fax receipts or transmissions may be indicated as transmissions which should not be logged in another form. In some cases, the fax transmission will be logged so that the receipt and routing of the fax can be determined at a later date.

The log file may contain, per fax, information such as the time and date of receipt by the fax receipt module 14, the time of the generation of fax file 16, any complications or information regarding the text conversion module 16, the time the text file 20 was generated, the destinations determined by the text analysis 22 or the fax analysis 24, the time and destinations transmitted by the outgoing communication device 28, user information from, number of pages received per faxed transmission, the sender of the fax, phone numbers, addresses, and any other information which could be regarded as useful to a facsimile user or sender.

In some cases, either the text conversion module 18 will not properly convert the received faxed file 16, or the text analysis 22 will not be able to determine a viable destination. In these cases, the outgoing communication device may route the fax file, the text file 20, or both to a default destination. In another form, the fax can simply be printed via a hardware printer and routed by hand via human personnel or stored to a default disk space.

The system illustrated in FIG. 1 may have several advantages in each of the various embodiments and permutations thereof. One potential advantage is that the system of FIG. 1 may be used as a scanner. The scanner function of FIG. 1 is discussed as follows. If a fax machine is coupled to the fax incoming communication device 10 of FIG. 1, then a user can fax a paper document to himself/herself. This faxed paper document is received by the incoming communication device 10 from the fax machine and processed by text conversion module 18 to a text file 20. This file 20 is subsequently mailed to the location indicated by the destination information obtained from the text file 20 by the text analysis module 22. Therefore, if one were to fax himself a document through the system in FIG. 1, that document would be sent to his/her computer destination as a text file 20 or image file and not necessarily on paper. Therefore, fax or paper documents can be converted to text computer formats which can be edited and changed by a user coupled to the system.

In addition, the man hours required to keep track of one or more fax machines by secretaries and/or support staff is very time consuming. By using the system illustrated in FIG. 1, man hours required to log and route faxes, especially those not containing explicit destination location information in the cover sheet or text of the fax itself, are significantly reduced compared to the prior art. Prior art fax machines operate by printing out a document received on a communication line and leaving the document for a human user to pick up and distribute. This technique is not secure, due to the fact that any user can grab the printed copy off of the fax machine and mis-route, steal, or illegally access the material transmitted. The system of FIG. 1 ensures a higher level of security since only those destined to receive the fax are those with access to the fax, since computer security measures typically exist to prevent others from logging into many intended destination locations. In addition, the intended destination locations may contain a large amount to security software to avoid viruses and unauthorized access.

When a fax is printed on paper in a prior art fax, the faxes need to be routed by human personnel and may be lost, routed late, or routed incorrectly. Once lost, routed incorrectly, or routed late, the fax can usually not be regained and resubmitted to its final destination. The system of FIG. 1 prevents this loss by storing the received fax permanently on disk or a like media and ensures that the fax will be routed to an end user in a timely, efficient, and secure manner. In addition, the system of FIG. 1 ensures extensive and proper logging of the receipt and communication of fax files without extensive human interaction. In many cases, faxes are transmitted to communicate routine information between offices and is not required to be on printed paper for storage. Therefore, the system of FIG. 1 is environmentally sound in that it saves paper when a fax need not be recorded on paper and only viewed by a user on a computer screen.

It is important to note that the outgoing communication device 28 can route one or more of either the text file 20 or the received fax file 16 depending upon conditions set within the receive module 12. In some cases, a sender will want the end user coupled to outgoing communication device 28 not to have textual access to his file so that the file cannot be changed or edited in an easy manner. In another form, the sender may wish to have the end user change the facsimile or edit the facsimile, in which case the text file 20 is communicated by the outgoing communication device 28. In many cases, the text file 20 can be E-mail transmitted in a much faster time than any received file. It is also important to note that the text conversion module 18 can use one or more of any known techniques to recognize not only computer-generated cover sheets comprising senders and destinations, but senders and destinations written by hand on a cover sheet of a facsimile document. In addition, translation software which translates a document from one language to another (e.g. Japanese to English or vice versa) may be incorporated into the text conversion module 18 or may be added as a new module. The text conversion module 18 can then recognize and translate facsimile senders, destinations, and text from foreign languages to English (and vice versa) so that a recipient and sender need not speak the same language.

It is important to note that the fax receipt module 14, text conversion module 18, text analysis module 22, fax analysis module 24, and outgoing communication device 28 may be "pipelined" in order to achieve greater throughput of faxes through the system. For example, a first fax may be in the process of being received by the fax receipt module 14 or may be in the process of being written to a fax file 16, while a second fax is being converted via the text conversion module 18 to a text file 20, while a third fax is being analyzed via text analysis module 20, fax analysis module 24, or both, while a fourth fax is being routed via the outgoing communication device 28. This technique will also ensure that one slow software portion within the system does not entirely slow the entire fax receiving process. For example, if the fax receipt module 14 can receive faxes faster than the text conversion module 14 can convert faxes, then the fox receipt module 14 can stack or queue received fax files 16 and not slow receipt of faxes through the incoming communication device 10. In another form, if a "bottleneck" is found wherein one of the modules 14, 18, 22, 24, or 28 is slowing the process, this slower program may be augmented by adding similar processing capability in parallel to the slow program to improve throughput (i.e. parallel software processing).

Figure 2:
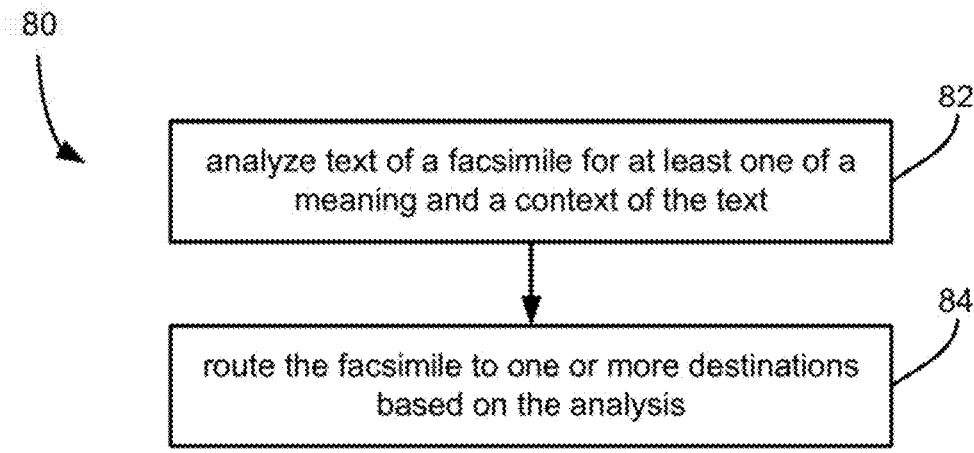
FIG. 2 is a flow diagram of a process for routing a facsimile in accordance with one embodiment of the present invention.

FIG. 2 illustrates a method 80 for routing a facsimile according to one embodiment. In operation 82, text of a facsimile is analyzed for at least one of a meaning and a context of the text. In operation 84, the facsimile is routed to one or more destinations based on the analysis.

Figure 3:
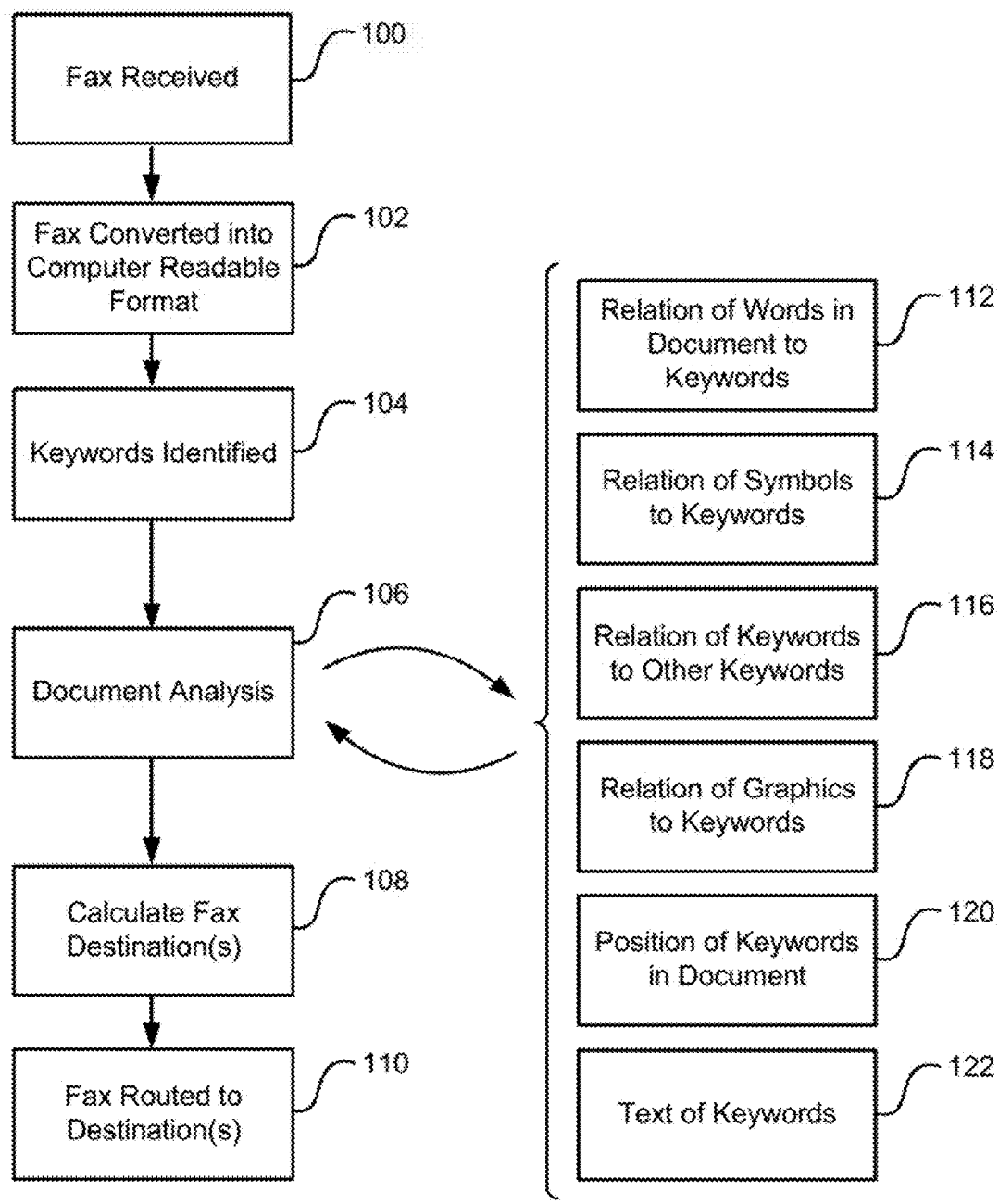
FIG. 3 illustrates, in a flowchart, a process performed by a fax routing system in accordance with one embodiment of the present invention.

FIG. 3 illustrates the operation of a system according to one embodiment of the present invention. In step 100, the fax is received. In step 102 the received fax is converted into a computer-readable document. In step 104 one or more keywords are identified in the computer-readable document. In step 106 document analysis is performed. Document analysis includes at least one of the following: determining the relation of one or more words in the document to one or more keywords in the document in 112, determining the relation of one or more symbols in the document to the one or more keywords in 114, determining the relation of one or more keywords in the document to the one or more other keywords in the document in 116, determining the relation of graphic elements in the document to the one or more keywords in the document in 118, determining the position of one or more keywords in the document in 120, and determining the significance of one or more of the keywords in 122.

Once document analysis 106 has been performed, one or more destinations of the fax are calculated based on the analysis 106. The fax is then routed to one or more destinations in 110.

Figure 4:
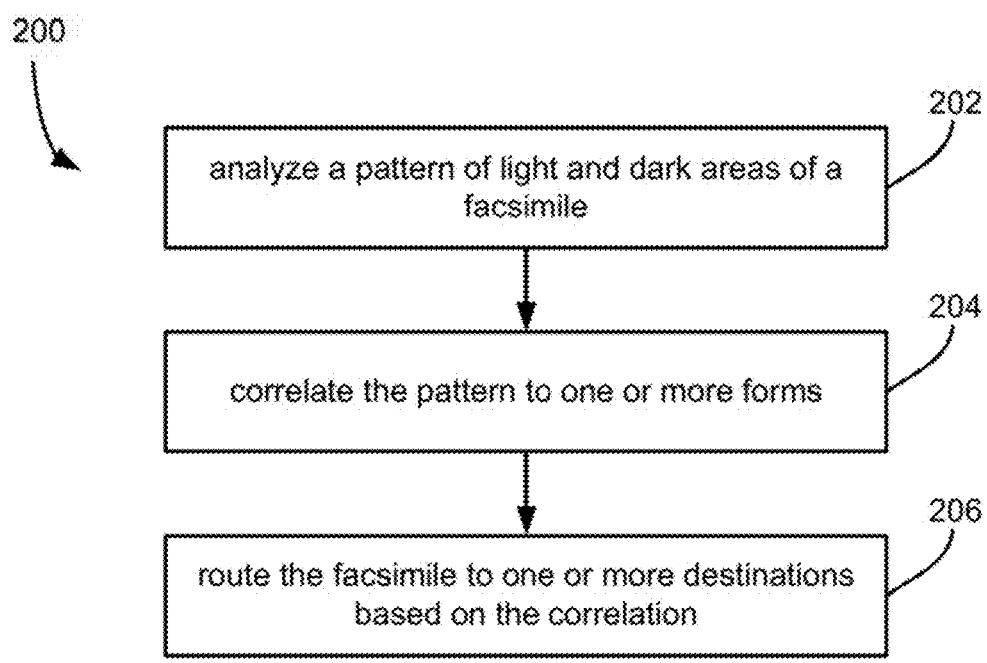
FIG. 4 is a flow diagram of a process for routing a facsimile in accordance with one embodiment of the present invention.

FIG. 4 depicts a method 200 for routing a facsimile according to another embodiment. In operation 202, a pattern of light and dark areas of a facsimile is analyzed. In operation 204, the pattern is correlated to one or more forms. In operation 206, the facsimile is routed to one or more destinations based on the correlation.

Figure 5:
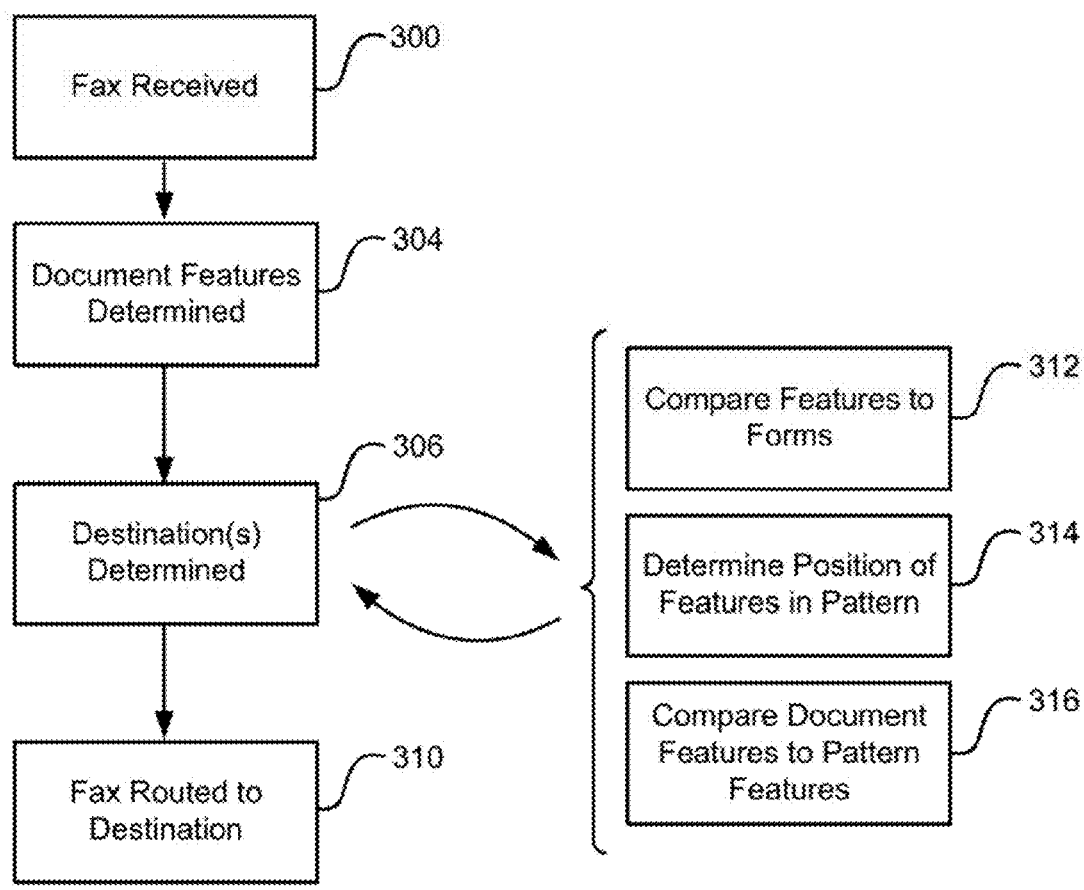
FIG. 5 illustrates, in a flowchart, a process performed by a fax routing system in accordance with another embodiment of the present invention.

FIG. 5 illustrates a flow chart which describes the operation of a system in one embodiment of the present invention. In step 300, the fax, which contains a pattern of light and dark areas, is received. In step 304 document features are determined for the received fax. In step 306 one or more destinations of the fax is calculated. Calculating one or more destinations of the fax may include one or more of the following: comparing the one or more document features to features of one or more forms, where the forms relate to one or more of a certain document type, in 312, determining the position of one or more of the document features within the pattern of light and dark areas in 314, and comparing at least one of the document features to other features of the pattern of light and dark areas in 316. Once one or more destinations have been determined in 306, the fax is routed to one or more destinations in 310.

In a further embodiment, a fax is received and used to start, or attempt to start, a business process. The meaning and/or context of the fax may be determined as above, and used to select the appropriate process to initiate. Such a process may be machine implemented, human implemented, or a combination of the two. When the business process is initiated and/or completes, a confirmation is sent back to the original document sender. For example, assume someone sends in an invoice. The fax is recognized as an invoice, which triggers initiation of an AP (accounts payable) process. A notification may be sent to the sender indicating that the invoice is being processed. When the invoice has been processed and payment is made, a notification may be sent to the invoice sender.

In the event that there is a problem with the business process, an exception may be generated and the original document sender is notified of the problem. This might occur in the invoice example above, for example, where products that are being invoiced haven't been delivered yet, if the AP process cannot be initiated for some reason, etc.

While the present invention has been illustrated and described with reference to specific embodiments, further modification and improvements will occur to those skilled in the art. For example, "code", as used herein, or "module", as used herein, is any plurality of binary values or any executable, interpreted or compiled code which can be used by a computer or execution device to perform a task. This code or module can be written in any one of several known computer languages. A "module," as used herein, can also mean any device which stores, processes, routes, manipulates, or performs like operation on data. An "incoming communication device" and "outgoing communication device" may be any communication devices which can be used for taking fax information and inputting the fax information into a module. A "text file" or "textual format", as used herein, may be any data format for efficiently storing alphanumerical data. In general, a text file or text format is any data structure which identifies individual alphanumeric characters letters, or language characters from any faxed transmission. A "string", as used herein, is one or more alpha numeric or textual characters which are identified as being part of a group (such as a human name). The fax destinations herein may be any type of computer or other destination which may not necessarily require display devices, user input devices, or memory. For example, an end-user or destination may simply be a disk drive or a paper-based facsimile machine. It is to be understood, therefore, that this invention is not limited to the particular forms illustrated and that it is intended in the appended claims to cover all possible modifications of the teachings herein.

The present description is presented to enable any person skilled in the art to make and use the invention and is provided in the context of particular applications of the invention and their requirements. Various modifications to the disclosed embodiments will be readily apparent to those skilled in the art and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

In particular, various embodiments discussed herein are implemented using the Internet as a means of communicating among a plurality of computer systems. One skilled in the art will recognize that the present invention is not limited to the use of the Internet as a communication medium and that alternative methods of the invention may accommodate the use of a private intranet, a LAN, a WAN, a PSTN or other means of communication. In addition, various combinations of wired, wireless (e.g., radio frequency) and optical communication links may be utilized.

The program environment in which a present embodiment of the invention is executed illustratively incorporates one or more general-purpose computers or special-purpose devices such facsimile machines and hand-held computers. Details of such devices (e.g., processor, memory, data storage, input and output devices) are well known and are omitted for the sake of clarity.

It should also be understood that the techniques presented herein might be implemented using a variety of technologies. For example, the methods described herein may be implemented in software running on a computer system, or implemented in hardware utilizing either a combination of microprocessors or other specially designed application specific integrated circuits, programmable logic devices, or various combinations thereof. In particular, methods described herein may be implemented by a series of computer-executable instructions residing on a storage medium such as a carrier wave, disk drive, or computer-readable medium. Exemplary forms of carrier waves may be electrical, electromagnetic or optical signals conveying digital data streams along a local network or a publicly accessible network such as the Internet. In addition, although specific embodiments of the invention may employ object-oriented software programming concepts, the invention is not so limited and is easily adapted to employ other forms of directing the operation of a computer.

Various embodiments can also be provided in the form of a computer program product comprising a computer readable medium having computer code thereon. A computer readable medium can include any medium capable of storing computer code thereon for use by a computer, including optical media such as read only and writeable CD and DVD, magnetic memory, semiconductor memory (e.g., FLASH memory and other portable memory cards, etc.), etc. Further, such software can be downloadable or otherwise transferable from one computing device to another via network, wireless link, non-volatile memory device, etc.

Figure 6:
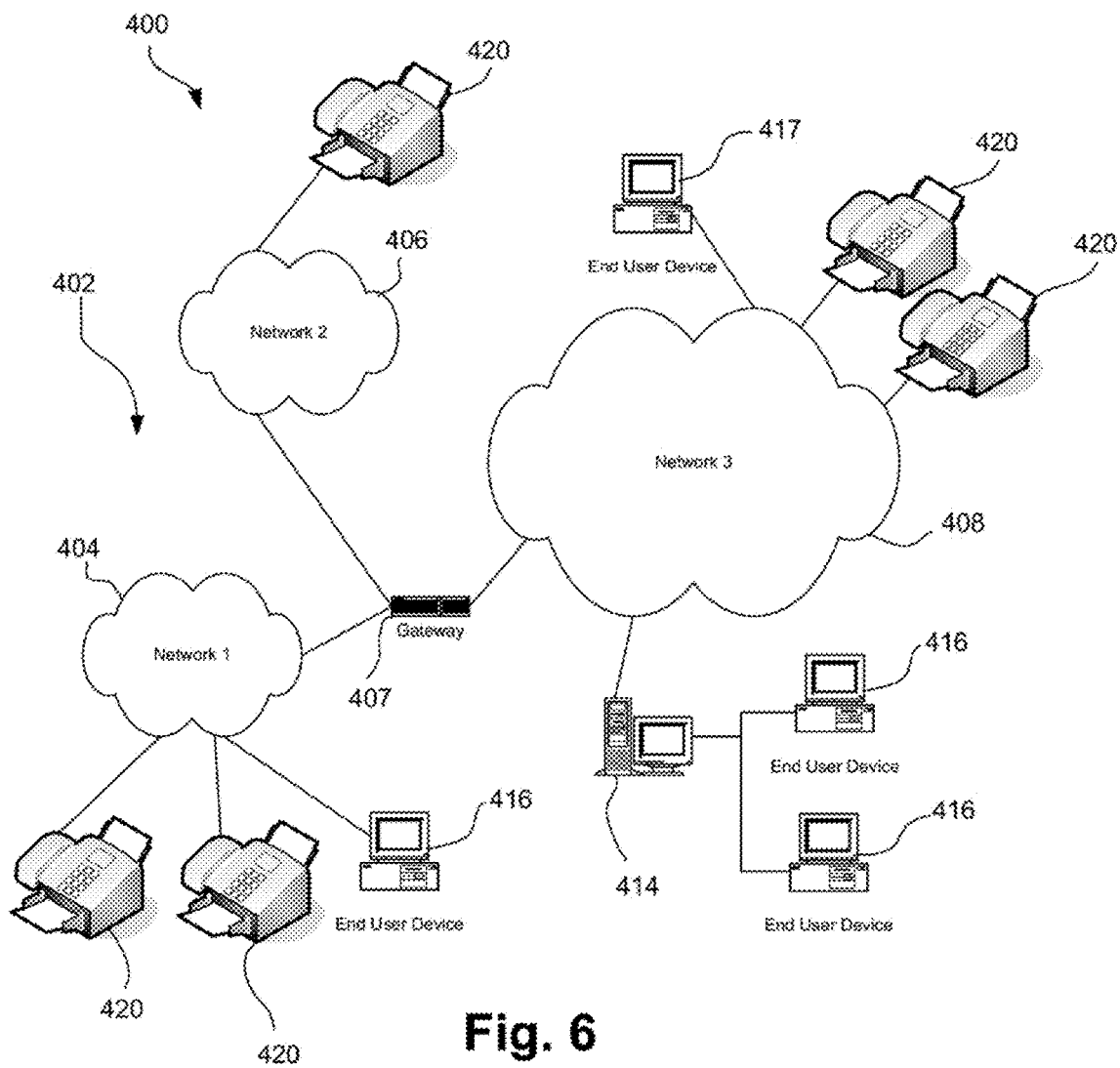
FIG. 6 is a network diagram illustrating a network architecture in which the various embodiments described herein may be implemented.

FIG. 6 illustrates a network architecture 400, in accordance with one embodiment. As shown, a plurality of remote networks 402 are provided including a first remote network 404 and a second remote network 406. A gateway 407 may be coupled between the remote networks 402 and a proximate network 408. In the context of the present network architecture 400, the networks 404, 406 may each take any form including, but not limited to a LAN, a WAN such as the Internet, PSTN, internal telephone network, etc.

In use, the gateway 407 serves as an entrance point from the remote networks 402 to the proximate network 408. As such, the gateway 407 may function as a router, which is capable of directing a given packet of data that arrives at the gateway 407, and a switch, which furnishes the actual path in and out of the gateway 407 for a given packet.

Further included is at least one data server 414 coupled to the proximate network 408, and which is accessible from the remote networks 402 via the gateway 407. It should be noted that the data server(s) 414 may include any type of computing device/groupware. Coupled to each data server 414 is a plurality of user devices 416. Such user devices 416 may include a desktop computer, lap-top computer, hand-held computer, printer or any other type of logic. It should be noted that a user device 417 may also be directly coupled to any of the networks, in one embodiment. A facsimile machine 420 or series of facsimile machines 420 may be coupled to one or more of the networks 404, 406, 408.

It should be noted that databases and/or additional components may be utilized with, or integrated into, any type of network element coupled to the networks 404, 406, 408. In the context of the present description, a network element may refer to any component of a network.

Figure 7:
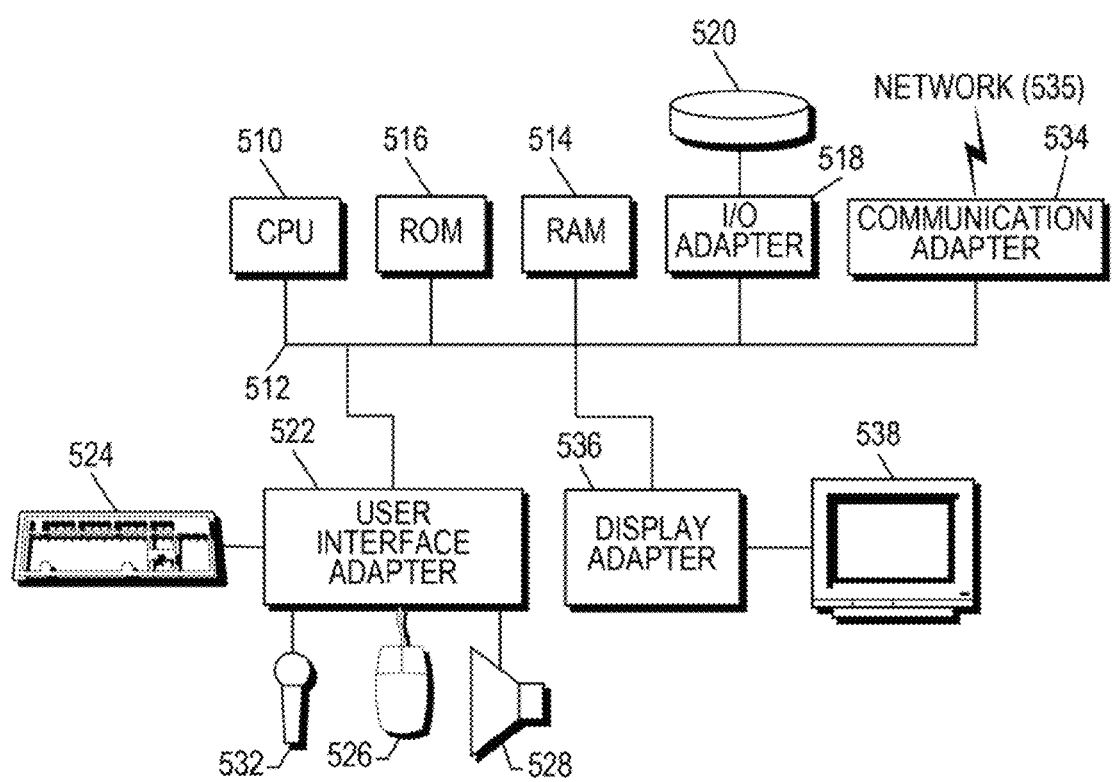
FIG. 7 is a system diagram of a representative hardware environment associated with a user device.

FIG. 7 shows a representative hardware environment associated with a user device 416 of FIG. 6, in accordance with one embodiment. Such figure illustrates a typical hardware configuration of a workstation having a central processing unit 510, such as a microprocessor, and a number of other units interconnected via a system bus 512.

The workstation shown in FIG. 7 includes a Random Access Memory (RAM) 514, Read Only Memory (ROM) 516, an I/O adapter 518 for connecting peripheral devices such as disk storage units 520 to the bus 512, a user interface adapter 522 for connecting a keyboard 524, a mouse 526, a speaker 528, a microphone 532, and/or other user interface devices such as a touch screen and a digital camera (not shown) to the bus 512, communication adapter 534 for connecting the workstation to a communication network 535 (e.g., a data processing network) and a display adapter 536 for connecting the bus 512 to a display device 538.

The workstation may have resident thereon an operating system such as the Microsoft Windows® Operating System (OS), a MAC OS, or UNIX operating system. It will be appreciated that a preferred embodiment may also be implemented on platforms and operating systems other than those mentioned. A preferred embodiment may be written using JAVA, XML, C, and/or C++ language, or other programming languages, along with an object oriented programming methodology. Object oriented programming (OOP), which has become increasingly used to develop complex applications, may be used.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method for routing a facsimile, comprising:
receiving text of a facsimile in a computer readable format;
ascertaining one or more of a significance and a relevance of at least a portion of the text by ascertaining a position of one or more keywords in the text, wherein at least two of the keywords are not adjacent in the text;
analyzing the text of the facsimile for at least one of a meaning and a context of the text;
routing the facsimile or text thereof to one or more destinations based on the analysis;
initiating a business process based on the analysis;
detecting a problem with the business process;
generating a notification of the problem; and
notifying one or more entities of the problem,
wherein the routing utilizes an outgoing communication device.

2. The method as recited in claim 1, wherein the analysis further includes matching one or more of the keywords to data stored in memory.

3. The method as recited in claim 1, wherein the analysis comprises recognizing at least one of a name, an email address and contact information in the facsimile.

4. The method as recited in claim 3, wherein one or more of the keywords comprises the name, the email address and/or the contact information.

5. The method as recited in claim 1, further comprising generating the text from the facsimile.

6. The method as recited in claim 1, further comprising storing at least some of the text in a memory.

7. The method as recited in claim 1, further comprising logging information relating to receipt and/or transmission of the facsimile.

8. The method as recited in claim 1, wherein at least one of the destinations corresponds to an intended recipient of the facsimile.

9. The method as recited in claim 1, wherein at least one of the destinations corresponds to a recipient other than an intended recipient of the facsimile.

10. A method as recited in claim 1, wherein the analysis further includes comparing one or more of the keywords in the text to at least one other element in the text.

11. A method as recited in claim 10, wherein the other element comprises one or more of a word, a symbol, and a keyword.

12. A system configured to route a facsimile, the system comprising a processor and logic in and/or executable by the processor to cause the processor to:
receive text of a facsimile in a computer readable format;
ascertain one or more of a significance and a relevance of at least a portion of the text by ascertaining a position of one or more keywords in the text, wherein at least two of the keywords are not adjacent in the text;
analyze the text of the facsimile for at least one of a meaning and a context of the text;
route the facsimile or text thereof to one or more destinations based on the analysis;
initiate a business process based on the analysis;
detect a problem with the business process;
generate a notification of the problem; and
notify one or more entities of the problem,
wherein the routing utilizes an outgoing communication device.

13. The system as recited in claim 12, wherein the analysis further includes matching one or more of the keywords to data stored in memory.

14. The system as recited in claim 12, wherein the analysis comprises recognizing at least one of a name, an email address and contact information in the facsimile.

15. The system as recited in claim 14, wherein one or more of the keywords comprises the name, the email address and/or the contact information.

16. The system as recited in claim 12, further comprising logic configured to cause the processor to generate the text from the facsimile.

17. The system as recited in claim 12, further comprising logic configured to cause the processor to store at least some of the text in a memory.

18. The system as recited in claim 12, further comprising logic configured to cause the processor to log information relating to receipt and/or transmission of the facsimile.

19. The system as recited in claim 12, wherein at least one of the destinations corresponds to an intended recipient of the facsimile.

20. The system as recited in claim 12, wherein at least one of the destinations corresponds to a recipient other than an intended recipient of the facsimile.

21. The system as recited in claim 12, wherein the analysis further includes comparing one or more of the keywords in the text to at least one other element in the text.

22. The system as recited in claim 21, wherein the other element comprises one or more of a word, a symbol, and a keyword.

23. A computer program product for routing a facsimile, the computer program product comprising a computer readable medium having non-transitory program code embodied therewith, the program code readable/executable by a processor to cause the processor to:
- receive text of a facsimile in a computer readable format;
- ascertain one or more of a significance and a relevance of at least a portion of the text by ascertaining a position of one or more keywords in the text, wherein at least two of the keywords are not adjacent in the text;
- analyze the text of the facsimile for at least one of a meaning and a context of the text;
- route the facsimile or text thereof to one or more destinations based on the analysis;
- initiate a business process based on the analysis;
- detect a problem with the business process;
- generate a notification of the problem; and
- notify one or more entities of the problem,
- wherein the routing utilizes an outgoing communication device.

24. The computer program product as recited in claim 23, wherein the analysis further includes matching one or more of the keywords to data stored in memory.

25. The computer program product as recited in claim 23, wherein the analysis comprises recognizing at least one of a name, an email address and contact information in the facsimile.

26. The computer program product as recited in claim 25, wherein one or more of the keywords comprises the name, the email address and/or the contact information.

27. The computer program product as recited in claim 23, further comprising generating the text from the facsimile.

28. The computer program product as recited in claim 23, further comprising storing at least some of the text in a memory.

29. The computer program product as recited in claim 23, further comprising logging information relating to receipt and/or transmission of the facsimile.

30. The computer program product as recited in claim 23, wherein at least one of the destinations corresponds to an intended recipient of the facsimile.

31. The computer program product as recited in claim 23, wherein at least one of the destinations corresponds to a recipient other than an intended recipient of the facsimile.

32. A computer program product as recited in claim 23, wherein the analysis further includes comparing one or more of the keywords in the text to at least one other element in the text.

33. A computer program product as recited in claim 32, wherein the other element comprises one or more of a word, a symbol, and a keyword.

* * * * *

UNITED STATES PATENT AND TRADEMARK OFFICE
CERTIFICATE OF CORRECTION

| | |
|---|---|
| PATENT NO. | : 8,792,126 B2 |
| APPLICATION NO. | : 14/054765 |
| DATED | : July 29, 2014 |
| INVENTOR(S) | : Couchman et al. |

It is certified that error appears in the above-identified patent and that said Letters Patent is hereby corrected as shown below:

In the specification:

col. 9, line 12 replace "art" with --an--;

col. 12, line 3 replace "fox" with --fax--.

Signed and Sealed this
Twenty-first Day of October, 2014

Michelle K. Lee
*Deputy Director of the United States Patent and Trademark Office*